United States Patent [19]

Maeda et al.

[11] Patent Number: 4,826,726

[45] Date of Patent: May 2, 1989

[54] HEAT-RESISTANT WIRE

[75] Inventors: Masahiko Maeda, Tokyo; Ryutaro Fujihira, Kanagawa; Yoshihiro Moteki, Oita; Naotoshi Watanabe, Kanagawa; Yuichi Sakon, Tokyo, all of Japan

[73] Assignee: Showa Denko Kabushiki Kaisha, Tokyo, Japan

[21] Appl. No.: 877,944

[22] Filed: Jun. 24, 1986

Related U.S. Application Data

[63] Continuation-in-part of Ser. No. 875,034, Jun. 16, 1986, abandoned.

[30] Foreign Application Priority Data

Jun. 24, 1985 [JP] Japan ................................ 60-136121

Jun. 24, 1985 [JP] Japan ................................ 60-136122

[51] Int. Cl.[4] .......................... B32B 15/00; H01B 7/00

[52] U.S. Cl. ............................ 428/379; 174/110 PM; 174/110 SR; 174/120 SR; 428/375; 428/383

[58] Field of Search ............... 428/379, 375, 392, 394, 428/461, 383; 174/110 PM, 110 SR, 120 SR

[56] References Cited

U.S. PATENT DOCUMENTS

| | | | |
|---|---|---|---|
| 3,340,212 | 9/1967 | Tomita | 428/379 |
| 3,705,909 | 12/1972 | Scott et al. | 260/329.3 |
| 3,888,943 | 6/1975 | Labana et al. | 260/836 |
| 3,951,871 | 4/1976 | Lloyd et al. | 252/511 |
| 3,976,715 | 8/1976 | Labana et al. | 260/836 |
| 3,976,716 | 8/1976 | Labana et al. | 260/836 |
| 3,976,718 | 8/1976 | Labana et al. | 260/836 |
| 3,976,719 | 8/1976 | Labana et al. | 260/836 |
| 4,009,149 | 2/1977 | King et al. | 260/49 |
| 4,069,275 | 1/1978 | Labana et al. | 260/836 |
| 4,125,739 | 11/1978 | Bow | 174/36 |
| 4,170,613 | 10/1979 | Marubashi | 525/403 |
| 4,237,037 | 12/1980 | Takahashi | 525/57 |
| 4,273,829 | 6/1981 | Perreault | 428/383 |
| 4,292,463 | 9/1981 | Bow et al. | 428/379 |
| 4,334,973 | 6/1982 | Carlson et al. | 204/181 |
| 4,349,654 | 9/1982 | Ohmae et al. | 525/208 |
| 4,416,944 | 11/1983 | Adur | 428/475.8 |
| 4,423,117 | 12/1983 | Machonis, Jr. et al. | 525/71 |
| 4,477,532 | 10/1984 | Schmukler et al. | 428/476.1 |
| 4,555,546 | 11/1985 | Patel | 525/84 |

FOREIGN PATENT DOCUMENTS 1396990 6/1975 United Kingdom .

*Primary Examiner*—Lorraine T. Kendell

*Attorney, Agent, or Firm*—Sughrue, Mion, Zinn, Macpeak and Seas

[57] ABSTRACT

A heat-resistnat wire is disclosed which comprises a line of copper or aluminum coated with a shielding material obtained by heating a mixture of: (A) an ethylenic copolymer comprised of ethylene and 0.1 to 20.0 mol % of a monomer of at most 30 carbon atoms having an oxirane group or a hydroxyl group and having at least one double bond; and (B) an ethylenic copolymer comprised of ethylene and 0.1 to 20.0 mol % of a monomer possessing a functional group capable of reacting with oxirane group or hydroxy group in the ethylenic copolymer (A). The wire is excellent not only in heat resistance but also in insulating ability and flexibility.

16 Claims, 1 Drawing Sheet

HEAT-RESISTANT WIRE

CROSS-REFERENCE TO RELATED APPLICATION

This is a continuation-in-part application of an earlier-filed application Serial No. 875,034 filed June 16, 1986, entitled "MOLDED PRODUCT HAVING PRINTED CIRCUIT BOARD", and now abandoned.

FIELD OF THE INVENTION

This invention relates to a heat-resistant wire which is coated with a thermally treated mixture of two or more ethylenic copolymers.

BACKGROUND OF THE INVENTION

As a winding having an insulating coat formed thereon by coating and baking an insulating paint, enameled wire has found extensive utility in numerous applications. For coil, which is one of the main uses for the enameled wire, to be capable of forming a strong magnetic field, it is necessary that the number of turns of the coil should be large and the magnitude of the electric current passed through the coil should be great. For this reason, the enameled wire used as coil is required to possess an insulating coat of sufficiently small thickness and, at the same time, to be capable of withstanding the Joule heat due to the great electric current.

Heat-resistant enameled wire possesses an enamel coat having at least one bond selected from imide bond, amide bond, and hydantoin bond. For the formation of this coat, polyester imide, polyimide hydantoin ester, polyamide imide ester, polyamide imide, and polyimide are mainly used, as described in U.S. Pat. Nos. 4,447,589, 4,497,944, 4,505,980, 4,307,226, 4,329,397, 4,269,397, 4,244,206, 4,258,155, 3,843,602, 3,817,942, 4,038,254, 3,817,921, 3,994,863 and 4,294,952, and British Pat. No. 1,392,649.

For the purpose of obviating the treatment with insulating varnish during the formation of a coil, there has been introduced a self-fusion wire which is provided on the surface thereof with an adhesive layer, as described in U.S. Pat. Nos. 3,705,909, 4,009,149, 4,334,973 and 4,273,829, and British Pat. No. 1,396,990, wherein a phenoxy resin, a polysulfone resin, and a polyimide resin which are aromatic macromolecular substances are chiefly used as the adhesive layer. However, it takes a relatively long time (some tens minutes) for any of these resins to be perfectly fused on an electric wire. Even in the case of a polyimide resin which exhibits satisfactory fusibility, there is a problem that about 50% of the adhesive layer produced by fusing under the conditions of 240° C. and 30 minutes peels in an atmosphere kept at 250° C., as reported Misao Wake, *Industrial Materials,* Vol. 30, No. 13, pp 33–37 (December 1982 issue).

In recent years, as electric devices and electronic devices are advancing toward gradual reduction in size in the field of ordinary electric wires, the electric wires distributed in such devices are steadily losing in diameter. Moreover, demand for electric wires possessing thermal stability to withstand the intense heat of automatic soldering and exhibiting satisfactory flexibility has been increasing. Under the circumstance, it has been proposed that polyethylene is coated on a copper wire and crosslinked, as in U.S. Pat. No. 4,125,739 and 3,951,871. As means of effecting the crosslinking, a method of electron-beam crosslinking has found popular recognition, as described in V. L. Lanza, *Modern Plastics,* Vol. 34, No. 10, p. 129 (1957). Although the polyethylene as the material for the coat has excellent heat resistance, the method itself entails the disadvantage that the process necessitates use of a large facility and the polyethylene coat on exposure to the electron beam is unevenly crosslinked and is liable to sustain a crack after a protracted use because the electron beam projected on the polyethylene coat is intercepted by the copper wire and prevented from permeating into the part of the polyethylene coat falling behind the copper wire. A method which comprises filling polyethylene with a silane compound and crosslinking the resulting mixture with water is also known, as described in H. G. Scott, *Modern Plastics,* March 1973. However, the formed coat does not adhere with ample fastness to the copper wire because the crosslinking occurs only in the surface portion and fails to proceed in the inner part of the coat. Since the crosslinking necessitates use of high-temperature steam, the facility used therefor is large. Moreover, since the crosslinking consumes much time, the entire process is not economical. In the coated wire produced by these crosslinking methods, since cooper wires as cores and resin layers as coats invariably adhere with insufficient fastness, peeling occurs inevitably between the polyethylene coats and the copper wires and this separation not merely lowers the overall strength of the coated wires but also accelerates the deterioration of the copper wires.

Further, in accordance with any of these methods, since the crosslinking does not proceed uniformly, part of the uncrosslinked polyethylene of the coat is melted while the coated wire is being soldered near 260° C. and the molten polyethylene interferes with smooth deposition of solder and causes thermal deformation of the wire itself. Thus, the coated wire cannot be effectively distributed by continuous soldering.

The electric wires are not solely used for the transfer of electric power but utilized in fields increasingly diversified in consequence of steady advance of industries. In the field of electric wires for communication, for example, the growth of the multiplex operation resorting to digital signals is encouraging shift of popularity from city cables to toll cables connecting cities, to carrier cables, and further to coaxial cables laid between cities separated by long distances. For communication with oversea countries, submarine cables are used.

An extra-high voltage cable, for example, is expanded by the heat generated when the cable is passing a large current. When the amount of electric current decreases, the cable loses the heat and shrinks. Owing to the repeated rises and falls of the temperature of the cable, gaps and distorsions occur in the insulator and the sheath and eventually cause breakage of the cable. To cope with this trouble, there is adopted an oil filled cable (OF) which has a spiral gap inserted inside the cable and an insulating oil is placed under a certain hydraulic pressure within the gap so as to adjust thermal expansion or contraction of the cable. This cable necessitates use of a sheath of such metal as lead or aluminum to withstand the hydraulic pressure. This method, however, puts an extra weight to the cable and degrades the workability and, in consequence of deterioration of the insulating oil, induces corrosion of the sheathing material. Another method contemplates a gas filled cable (GF) which fills the gap inside the cable with an inert gas (such as nitrogen) to seal in the pressure. Undoubtedly, this method calls for very great care for the observation and adjustment of the gas pressure.

Some of the power cables are insulated with crosslinked polyethylene (CV, CE) and others are insulated with polyethylene and sheathed with polyvinyl chloride (EV). Recently, synthetic rubbers such as ethylene-propylene rubber (EPR) and styrene-butadiene rubber (SBR) have come to find growing acceptance because they have good elasticity and good water resistance, weigh little, have no possibility of yielding to galvanic corrosion, and warrant ease of installation. The rubber coating, similarly to the coating of crosslinked polyethylene, is excellent in flexibility and water resistance but deficient in adhesion to the conductor and the sheath. When subjected to repeated folding or to repeated changes of temperature, therefore, it produces gaps between the layers and consequently induces degradation of weatherability and water resistance. Further, the rubber materials are inferior to the crosslinked polyethylene material in electrical properties such as insulation resistance, dielectric strength, and high-frequency properties.

SUMMARY OF THE INVENTION

An object of this invention is to provide a heat-resistant wire which is free from the drawbacks mentioned above and excellent not only in heat resistance but also in insulating ability and flexibility and which can be produced by an easier and less expensive method than the conventional method.

That is, this invention is a heat-resistant wire comprising a line of copper or aluminum coated with a shielding material obtained by heating a mixture comprised of:

(A) 1 to 99% by weight of an ethylenic copolymer comprised of ethylene and 0.1 to 20.0 mol% of a monomer of at most 30 carbon atoms having an oxirane group or a hydroxyl group and having at least one double bond, and (B) 99 to 1% by weight of an ethylenic copolymer comprised of ethylene and 0.1 to 20.0 mol% of a monomer possessing a functional group capable of giving rise to at least 60 wt% of extraction residue when heated to react with the oxirane group or hydroxyl group in the ethylenic copolymer (A) at a temperature of 300° C. for 20 minutes and extracted in boiling toluene for 3 hours, wherein the shielding material contains at least 60 wt% of the extraction residue.

DETAILED DESCRIPTION OF THE INVENTION

Figure 1:
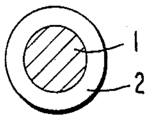
FIG. 1 through FIG. 7 are magnified cross sections of typical heat-resistant wires of the present invention.
Figure 2:
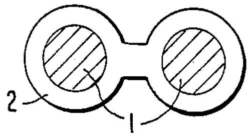
Figure 3:
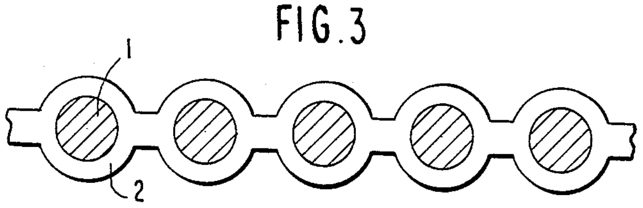
Figure 4:
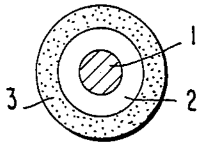
Figure 5:
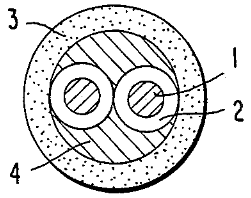
Figure 6:
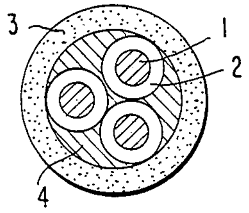
Figure 7:
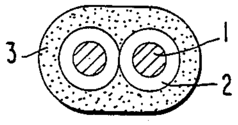

The present invention will be described in detail below.

(A) ETHYLENIC COPOLYMER (A)

The ethylenic copolymer to be used in the present invention is a copolymer of ethylene and 0.1 to 20 mol% (copolymerization ratio) of a monomer of at most 30 carbon atoms having an oxirane group or a hydroxyl group and having at least one double bond (hereinafter referred to as "comonomer (1)") or a copolymer of ethylene, the comonomer (1) and an unsaturated carboxylic acid ester and/or a vinyl ester which have at most 30 carbon atoms (hereinafter referred to as "comonomer (2)").

The comonomer (1) of this copolymer is a monomer having at most 30 carbon atoms, preferably 6 to 30 carbon atoms. Of the monomers, typical examples of monomers having an oxirane group (hereinafter referred to as "oxirane type compounds") are those represented by the following general formulae (I) through (III).

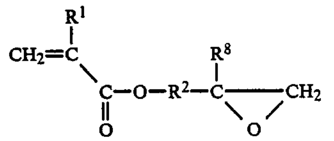
(I)

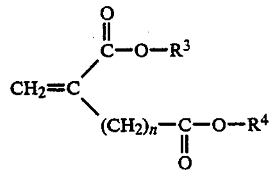
(II)

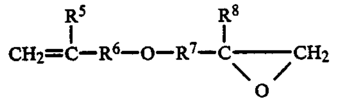
(III)

wherein $R^1$, $R^5$ and $R^8$ which may be the same or different, each represents a hydrogen atom or a methyl group; $R^2$, $R^6$ and $R^7$ which may also be the same or different, each represents a straight chain or branched chain alkylene group having 1 to 12 carbon atoms; $R^3$ and $R^4$ each represents a straight chain or branched chain alkyl group having up to 12 carbon atoms and a straight chain or branched chain alkyl group having 2 to 12 carbon atoms and having an oxirane group at the terminal, provided that at least one of $R^3$ and $R^4$ has the alkyl group having an oxirane group; and n is 0 or 1.

Examples of the oxiran type compound include butenecarboxylic acid monoglycidyl ester, glycidyl methacrylate, glycidyl acrylate, methylglycidyl acrylate, methylglycidyl methacrylate, itaconic acid glycidyl ester, 7,8-epoxy-1-octyl methacrylate, itaconic acid methylglycidyl ester, 7,8-epoxy-1-octyl vinyl ether, vinyl glycidyl ether, allyl glycidyl ether, and 2-methyl-2-propenyl glycidyl ether.

Of the comonomers (1), the monomers having a hydroxyl group (hereinafter referred to as "hydroxyl type compounds") are represented by α-alkenyl alcohols and hydroxyalkyl (meth)acrylates, both having up to 30 carbon atoms and preferably 3 to 25 carbon atoms. Typical examples of the hydroxyl type compounds include hydroxymethyl(meth)acrylates, hydroxyethyl(meth)acrylate, hydroxypropyl(meth)acrylates, hydroxybutyl(meth)acrylates, hydroxyhexyl(meth)acrylates, and allyl alcohols.

Examples of the comonomer (2) include unsaturated carboxylic acid esters containing up to 30 carbon atoms, preferably up to 20 carbon atoms, more preferably up to 12 carbon atoms such as methyl(meth)acrylates, ethyl(meth)acrylates, alkoxyalkyl(meth)acrylates, n-butyl(meth)acrylate, n-hexyl(meth)acrylate, n-octyl(meth)a-crylate and 2-ethylhexyl(meth)acrylate, and vinyl esters containing up to 30 carbon atoms, preferably up to 20 carbon atoms, more preferably up to 12 carbon atoms, such as vinyl acetate, vinyl propionate, and isopropenyl acetate.

Further, those copolymer which are obtained by saponifying copolymers of ethylene with vinyl esters (particularly vinyl acetate) may be used as the ethylenic copolymer (A).

(B) ETHYLENIC COPOLYMER (B)

The ethylenic copolymer (B) to be used in the present invention is a copolymer of ethylene and a monomer having a functional group capable of producing an ester bond by heating to react with the oxirane group or hydroxyl group in the aforementioned ethylenic copolymer (A) at a temperature of 300° C. for 20 minutes (hereinafter referred to as "comonomer (3)") or a copolymer of ethylene, the comonomer (3) and the aforementioned comonomer (2).

Typical examples of the comonomer (3) include unsaturated monocarboxylic acids containing up to 25 carbon atoms, preferably 3 to 10 carbon atoms, such as acrylic acid, methacrylic acid, and crotonic acid; unsaturated dicarboxylic acids containing 4 to 50 carbon atoms, preferably 4 to 30 carbon atoms, more preferably 4 to 20 carbon atoms, such as maleic acid, fumaric acid, tetrahydrophthalic acid, itaconic acid, citraconic acid, 4-methylcyclohexane-4-en-1,2-dicarboxylic acid, and bicyclo(2,2,1)hepta-5-en-2,3-dicarboxylic acid, and anhydrides of these unsaturated dicarboxylic acids.

Of the ethylenic copolymer (B), the copolymers of ethylene and an unsaturated dicarboxylic acid anhydride and the copolymers of the above monomers and the comonomer (2) (i.e., an unsaturated carboxylic acid ester and/or a vinyl ester) may be subjected to hydrolysis and/or alcohol modification to partially or wholly convert the dicarboxylic acid anhydride unit in these copolymers into dicarboxylic acid unit or half ester unit.

The hydrolysis can be carried out by reacting the ethylenic copolymer (B) with water generally at a temperature of 80° to 100° C. for 0.5 to 10 hours (preferably 2 to 6 hours, more preferably 3 to 6 hours) in the presence of a catalyst such as tertiary amine (e.g., triethylamine) in an organic solvent which can dissolve the copolymer, and neutralizing the resulting solution with an acid.

The alcohol modification can be carried out according to the solution process or kneading process described below.

The solution process is a process wherein the ethylenic copolymer (B) is reacted with an alcohol in the presence or absence (in which case the reaction is slow) of the above described catalyst at a reflux temperature of the alcohol generally for 2 minutes to 5 hours (preferably 2 minutes to 2 hours, more preferably 15 minutes to 1 hour) in an organic solvent as in the case of the hydrolysis.

On the other hand, the kneading process is a process wherein the ethylenic copolymer (B) is allowed to react by kneading with about 0.01 to 1.0 part by weight (preferably 0.05 to 0.5 part by weight) on the basis of 100 parts by weight of the copolymer (B) of a tertiary amine and about 0.1 to 3.0 moles (preferably 1.0 to 2.0 moles) of an alcohol per mole of dicarboxylic acid anhydride unit in the copolymer (B) at a temperature higher than the melting point of the copolymer (B) but lower than the boiling point of the alcohol used, for several minutes to several tens minutes (preferably 10 minutes to 30 minutes) by means of a kneading machine such as Banbury mixer, extruder, etc. that are commonly used in the fields of rubber, synthetic resin, etc.

Examples of the alcohol used in the above described alcohol modification include straight chain or branched chain alcohols containing preferably 1 to 12 carbon atoms such as methyl alcohol, ethyl alcohol, and primary butyl alcohol.

In the case of the hydrolysis as well as the alcohol modification, the % conversion to dicarboxylic acid and the % esterification to half ester is both preferably 0.5 to 100%, and more preferably 10.0 to 100%.

The content (copolymerization ratio) of ethylene in the ethylenic copolymers (A) and (B) is 50 to 99.98 mol%, preferably 60 to 99.8 mol%, and more preferably 65 to 99.0 mol%. The total content of the comonomer (1) or the comonomer (3) in the respective copolymer is 0.01 to 20 mol%, preferably 0.1 to 20 mol%, more preferably 0.1 to 15 mol%, and most preferably 0.2 to 15 mol%. If the content of the comonomer (1) or (3) is less than 0.01 mol%, when crosslinked with the ethylenic copolymers (A) and (B) by heating, not only does the crosslinking become incomplete, but also the adhesion to the metallic line becomes insufficient. Whereas, even if the content exceeds 20 mol%, the characteristic features of this invention may be manifested, but it is not preferred from the economically standpoints.

Further, when the copolymer further containing the comonomer (2) is used, the total content of the comonomer (2) in the copolymer is up to 30 mol%, preferably 0.1 to 30 mol%, and more preferably 0.5 to 25 mol%. If the content exceeds 30 mol%, the softening point of the copolymer rises, so that the fluidity is deteriorated, and further it is not economical.

The melt index (as measured according to ASTM D-1238 under Condition E; hereinafter referred to as "M.I.") of the above described ethylenic copolymer (A) and (B) is generally 0.01 to 1000 g/10 min., preferably 0.05 to 500 g/10 min., more preferably 0.1 to 500 g/10 min., and most preferably 0.1 to 300 g/10 min. When those copolymers having the M.I. of less than 0.01 g/10 min. are used, not only is the homogeneous mixing of these copolymers difficult, but also the moldability of the resulting mixture is not good.

Of these ethylenic copolymers, where they are prepared by a copolymerization process, ethylene and the comonomer (1) or the comonomer (3), or these and the comonomer (2) are copolymerized at a temperature of 40° to 300° C. under a high pressure of usually 500 to 3000 kg/cm$^2$ in the presence of a free-radical generator (for example, oxygen, organic peroxides, azo compounds, diazo compounds). In the copolymerization, saturated or unsaturated hydrocarbons such as ethane, propane and propylene are used as a chain transfer agent. Of the chain transfer agents, a trace amount of unsaturated hydrocarbons copolymerize with the monomers. Such a process is well known. Also, the process wherein hydrolysis and/or alcohol modification are carried out for the preparation of the above described ethylenic copolymer (B) and the process wherein saponification is carried out for the preparation of the ethylenic copolymer (A) are also well known.

Of the various ethylenic copolymers, when the ethylenic copolymer (A) incorporating therein an oxirane type compound and the ethylenic copolymer (B) using an unsaturated dicarboxylic anhydride as the comonomer (3) are used, the mixture consequently produced can be crosslinked at a relatively low temperature (160° C. to 250° C.). This cross-linking proceeds quickly and uniformly and the crosslinking product adheres with ample fastness to the line of metal. Therefore, the combination of these copolymers are particularly preferred.

(C) PREPARATION OF MIXTURE

(1) Mixing ratio

When preparing the mixture of this invention, the mixing ratio (by weight) of the ethylenic copolymer (A) to the ethylenic copolymer (B) is 1/99 to 99/1, preferably 5/95 to 95/5, and more preferably 10/90 to 90/10. In the case where the mixing ratio is less than 1/99 or exceeds 99/1, when the mixture is crosslinked by the later described process, the crosslinking is insufficient, so that the resulting shielding material does not exhibit good adhesion to the line of metal as later described.

(2) Mixing method

The mixture can be obtained by homogeneously mixing the ethylenic copolymer (A) and the ethylenic copolymer (B) in accordance with, for example, the dry blending method using a mixer such as Henschel mixer in wide use in the field of olefinic polymer, or the melt kneading method using a mixer such as Banbury, extruder, or roll mill. More homogeneous mixture can be obtained by melt kneading the mixture which has been dry blended. In the melt kneading it is important that a crosslinking reaction does not substantially take place between the ethylenic copolymer (A) and the ethylenic copolymer (B). If the crosslinking occur, when the resulting mixture is processed by molding as later described, not only does the moldability become poor but also the heat resistance of the molded product is lowered. For the reason, the melt kneading temperature is from room temperature (20° C.) to 150° C., preferably below 140° C., though it varies depending on the kind and the viscosity of the ethylenic polymers used. When the melt kneading is carried out at a relatively high temperature (e.g., 100° to 150° C.), the kneading time should not be too long and it is generally 1 to 5 minutes.

As a tentative criterion of this "mixture with substantially no crosslinking reaction", residual particles larger than 0.1 micron in diameter after 3-hour extraction of the mixture in boiling toluene (herein referred to as "extraction residue") is in general not more than 15 wt%, preferably not more than 10 wt%, and most preferably not more than 5 wt%.

In the preparation of this mixture, so far as the characteristics (physical properties) of the shielding material of this invention are not impaired, there may be added additives widely used in the field of olefinic polymer such as stabilizers to oxygen, light (ultraviolet rays), and heat; a metal deterioration preventing agent, a flame retarder, an electrical characteristics improving agent, an antistatic agent, a lubricant, a processibility improving agent, and a viscosity improving agent. Further, by adding a crosslinking promotor such as a monoamine type compound, a polyamine type compound, an epoxy compound, p-toluenesulfonic acid, zinc chloride, magnesium acetate, an ammonium halide, and phosphoric acid, which varies depending on the kind of the ethylenic copolymers (A) and (B), the crosslinking of the ethylenic copolymers (A) and (B) in the later described heat treatment can be completed more easily. The amount of the crosslinking promotor is usually up to 5.0 parts by weight, preferably 0.01 to 3.0 parts by weight, per 100 parts by weight of the copolymers. Also, insulation property of the shielding material can be improved by adding an insulating ceramic such as alumina or silicon nitride. In addition to the above, by filling inorganic powdery material, glass fiber, glass beads, etc. the function of this invention can be more enhanced.

(D) LINE OF COPPER OR ALUMINUM

The line of copper or that of aluminum to be used in the present invention preferably posseses not less than 60% of electric conductivity as measured by the procedure defined in Paragraph 6, "Electric Conductivity" of JIS C-3002-1975 (Method for Testing Electricity Grade Copper Wire and Aluminum Wire). It is made of copper and aluminum as metals or of alloys having these metals as their main components (not less than 50% by weight). The cross section of this line is determined by the application in which the line is used, namely, the magnitude of the electric current to be utilized for the application.

The term "wire" as used in the present invention embraces enameled wires and cables besides ordinary electric wires.

In the case of enameled wires, the lines used therein generally have cross sections ranging from $1\times10^{-5}$ $mm^2$ to 5 $mm^2$, preferably from $1\times10^{-4}$ $mm^2$ to 4 $mm^2$. Depending on the purposes for which the electric wires are used, lines of varying cross sections can be adopted. Particularly, lines having cross sections ranging from $1\times10^{-2}$ $mm^2$ to 4 $mm^2$ are used advantageously. The wire may be made of only one line. Otherwise, it may be in the form of a cable (stranded wire) produced by intertwining two or more lines.

Figure 8:
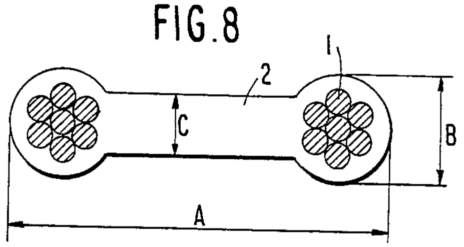
FIG. 8 is a magnified cross section of a heat-resistant wire of the present invention used as a feeder cord for a television receiver.

The lines in ordinary electric wires have cross sections ranging from 0.5 to 100 $mm^2$, to be determined by the volumes of electric current actually used. In accordance with JIS, the counts of electric wires are fixed by their cross sections. In the case of a wire to be distributed indoors for supply of a voltage not exceeding 600 volts, the diameter of the line is not less than 1 mm and not more than 5 mm. In the case of a stranded wire, the nominal cross section of the line for supply of the same voltage is not less than 0.75 $mm^2$ and nor more than 100 $mm^2$. Magnified cross sections of typical round wire, flat wire, and three-core wire usable in the present invention are shown in FIG. 1 through FIG. 7. In these figures, 1 stands for a conductor (line), 2 stands for a coat (shielding material: crosslinked mixture), 3 for a sheath, and 4 for an intermedium. The thickness of the conductor (line) and that of the coat are defined by JIS C-2336 to C-3621. In the case of a wire for a neon tube rated for 15 KV, for example, the cross section of the conductor (line) is defined to be 2.0 $mm^2$ and the thickness of the insulating layer to be 2.0 to 3.2 mm. In the case of a PVC-coated single-core wire (of a voltage of not more than 600 V), the thickness of the insulating layer is defined to be 2.4 mm where the nominal cross section of the wire is 3.5 $mm^2$ (formed of 45 strands of 0.32 mm in diameter). In the case of a Grade-2 wire rated for 600 V, the insulation layer is defined to have a thickness of 2.0 mm where the nominal cross section of the conductor is 100 $mm^2$ (formed of 19 strands of 2.6 mm in diameter). In the case of a feeder cord for a television receiver, the conductor is formed of 7 strands of 0.32 mm in diameter. The size of the cord illustrated in the magnified cross section of FIG. 8 is defined to be 10 mm for A, 2 mm for B, and 1 mm for C.

The wires to be used such as for electric insulation and mechanical protection of wires distributed generally in electric devices, electric measuring instruments, communication devices, and their accessories are indicated in JIS C-2410 and C-3210 through C-3306. In C-3214, for example, in the case of a polyester imide-coated copper wire, the maximum thickness of the smallest coating layer is defined to be 260 microns where the diameter of the conductor is 0.20 mm (cross section 0.031 $mm^2$).

Then, in the case of a high-voltage cable, the cross section of the line is 100 to 4,000 $mm^2$, preferably 100 to 3,800 $mm^2$, and more preferably 100 to 3,400 $mm^2$. The cross sections are determined by magnitudes of electric current to be actually used. The counts of the wires are determined by their cross sections in accordance with JIS. In the case of a single-core cable of a crosslinked polyethylene coat rated for 3,300 volts, for example, the cable is a circular compressed shape of the configuration of number of strands/diameter of strand of 96/2.9 mm and the thickness of the polyethylene insulating layer is defined to be 4.0 mm and that of the sheath to be 2.9 mm (JIS C-3806). The thickness of the conductor (line) and that of the coat are defined in JIS C-3606 and C-3605 (JIS C-3605 applies to the lines rated for not more than 600 volts and JIS C-3606 to the lines rated for 600 volts to 60,000 volts).

In the case of a single-core cable coated with crosslinked polyethylene and rated for 3,300 volts, for example, the number of strands is 127, the diameter of strand 3.2 mm, and the thickness of the insulating layer 4.5 mm where the nominal cross section of the conductor is 1,000 $mm^2$. In the case of a three-core sheathed cable rated for 3,300 volts, the number of strands is 37, the diameter of strand 2.6 mm, and the thickness of the insulating layer 3.5 mm where the nominal cross section of the conductor is 200 $mm^2$. In the case of a three-core sheathed cable rated for 6,600 volts, the number of strands is 61, the diameter of strand 2.3 mm, the thickness of the insulating layer 4.5 mm, the thickness of the sheath 4.0 mm and the outside diameter of the insulating layer 29.7 mm where the cross section of the conductor is 250 $mm^2$. These high-voltage cables coated with a crosslinked polyethylene are used in circuits for electric powers of 3,300 volts and 6,600 volts. These power cables, depending on their main applications to general appliances, traveling appliances, aerially suspended systems, buried systems, submarine systems, and extra-high voltage systems, are divided by working voltage into varying grades in the range of 600 to 275,000 volts and by number of cores into the three types, i.e., single-core, two-core, and three-core types. The cables have been their armor structures defined.

The ratio of the cross section of the line to that of the wire depends on the working voltage of the wire or cable. This ratio is small in the wires requiring insulation. To be more specific, the ratio decreases, namely, the thickness of the insulating layer increases, in proportion as the voltage increases. Generally, this ratio is 1 to 95%, preferably 5 to 90%.

(E) PRODUCTION OF WIRE

For the production of the enameled wire, any conventional methods in the field of electric wires can be adopted. Since the mixture can be molded by the melt extrusion, it can be extruded and deposited on the circumference of a core line with a cross-head die of popular use. For the produced coat to acquire the thickness to be defined afterward, it suffices to increase the line speed. Generally, the line speed is in the range of 10 to 100 m/minute.

Where the cross section of the line is in the range of $1\times10^{-5}$ $mm^2$ to 1 $mm^2$, the thickness of the mixture of this invention which forms the coat is in th range of 10 to 30 microns. Where the cross section is 1 to 5 $mm^2$, the thickness is desired to fall in the range of 20 to 50 microns.

For the production of the wire of this invention, the extrusion temperature is in the range of 80° to 160° C. (preferably 100° to 160° C.). If this temperature is lower than 80° C., the extrusion molding is obtained only with difficulty because the mixture fails to melt. If the temperature exceeds 160° C., there ensues the disadvantage that the mixture is partially crosslinked and the coat having a uniform surface cannot be obtained. The production of a wire having a thin coating layer is attained by immersing the aforementioned line of metal in an organic solvent (such as, for example, toluene) having the aforementioned mixture dissolved or suspended therein, thereby forming the coating layer of the mixture on the surface of the line or by applying the aforementioned organic solvent containing the mixture on the surface of the line, thereby forming a coating layer thereon. When either of the methods is adopted, the organic solvent so used must be thoroughly expelled by evaporation.

The production of an ordinary wire or a cable can be accomplished by using the same method as described above. A typical method available for the production of a wire formed of only one line comprises passing the line through the central part of an extruder provided with a cross-head and causing the aforementioned mixture in a molten state to be uniformly deposited on the surface of the line. In the case of a wire formed of two lines and in the case of a stranded cable as well, the same method as described above can be effectively used for the production. In the case of an ordinary wire, the coat of the mixture of this invention is not less than 50 microns, preferably 50 microns to 6 mm, and more preferably 50 microns to 5 mm. If this thickness exceeds 5 mm, the produced wire is so deficient in flexibility as to render its handling difficult, though it warrants insulation depending on the purpose of use. If the thickness is less than 50 microns, the produced wire suffers from insufficient insulation. Although the thickness of the insulating coat (crosslinked mixture) is variable with the purpose for which the wire is used, the proper thickness is roughly in the range of 2.0 to 3.2 mm where the voltage is not more than 600 volts. In the case of a wire distributed inside a mechanical device rated for not more than 100 volts, the thickness is not more than 1 mm (generally in the range of 0.05 to 0.5 mm). Then, in the case of a cable, the thickness of the coat of the mixture of this invention is required to exceed 1.0 mm and is desired to fall in the range of 1 mm to 35 mm, preferably in the range of 1.5 mm to 35 mm. If this thickness exceeds 35 mm, the produced coat is deficient in flexibility and the wire is destitute of ease of handling, although it may warrant insulation depending on the purpose for which the wire is actually used. If the thickness is less than 1.0 mm, the produced coat proves undesirable because of insufficient insulation. Although the thickness of the insulating coat (crosslinked mixture) is variable as described above with the purpose for which the wire is used, the proper thickness generally falls in the range of 4.0 to 10 mm where the voltage is 600 volts or higher. Further, in the production of a two-core or three-core wire, the practice of causing two or three lines each coated with the aforementioned insulating layer to be bundled with a sheathing material is followed. The coating with the sheathing material is effected by the same method as described above.

In the production of the wire of the present invention, near the cross-head of the extruder, the mixture containing the aforementioned ethylenic copolymer (A) and the ethylenic copolymer (B) is not substantially crosslinked. After this mixture is molded, it is reheated at a temperature high enough for the mixture to be crosslinked so as to complete the crosslinking. Although the temperature of this heat treatment is different depending on whether the mixture contains the aforementioned crosslinking promotor or not, it generally falls in the range of 120° to 380° C. If this temperature is lower than 120° C., the crosslinking fails to proceed and the produced coat suffers from insufficient resistance to heat. If the temperature exceeds 380° C., since at least part of the ethylenic copolymers of which the aforementioned mixture is composed begins to deteriorate, the produced coat has the disadvantage that the surface thereof is discolored and the strength thereof is lowered. The duration of the heat treatment is variable with the temperature of the heat treatment and the presence or absence of the crosslinking promotor, it generally falls in the range of 1 to 10 minutes where the temperature is not lower than 250° C. The duration is in the range of 2 to 30 minutes when the temperature is lower than 250° C. To prevent the surface of the coat from oxidation, the heat treatment is desired to be carried out in the atmosphere of an inert gas (such as, nitrogen gas). Further, since the mixture is melted and consequently shrunken or deformed during the heat treatment, it is necessary that the heat treatment be carried out with tension imparted to the opposite ends of the wire. This tension is required not to be higher than the level at which the core line is broken and not to be lower than the level at which the line sags under its own weight.

Besides the methods described above, there is a method which comprises elevating the temperature of the head part of the extruder to a temperature in the range of 160° to 380° C. at the same time that the mixture is deposited in the form of a coat with the extruder thereby causing the coat of the mixture to be crosslinked. This method, however, proves undesirable because the mixture gives rise to gel and consequently clogs the nozzle part at the leading end of the head and the surface of the produced coat is roughened with gel particles.

The production of the coated wire by the method of extrusion is carried out at a temperature falling in a range in which the mixture is melted but is not crosslinked. Desirably, the temperature is in the range of 80° to 160° C., particularly in the range of 100° to 150° C. (preferably 100° to 140° C.). Thereafter, the coat of mixture is left cooling and reheated as described above so that the mixture may be crosslinked substantially completely. As the standard for rating the degree of this crosslinking, the aforementioned extraction residue is at least 60 wt%, preferably 70 wt%, and more preferably 75 wt%.

Now, the present invention will be described more specifically with reference to working examples below.

In the Examples and the Comparative Examples, the heat resistance was evaluated by allowing a given wire to float for 60 seconds on a solder bath (lead/tin=90/10 (by weight)) adjusted to 300° C.

The mixture of an ethylenic copolymer (A) and an ethylenic copolymer (B) used in the Examples and the Comparative Examples are shown below.

(i) a mixture of a saponification product obtained by saponifying an ethylene/vinyl acetate copolymer having vinyl acetate in a copolymerization ratio of 11.24 mol% (saponification degree 97.5%, M.I. 75 g/10 minutes, and density 0.951 g/cm$^3$; hereinafter referred to as "Saponification Product") and an ethylene/acrylic acid copolymer having M.I of 300 g/10 minutes (density 0.954 g/cm$^3$ and copolymerization ratio of acrylic acid 8.86 mol%; hereinafter referred as to "EAA") in the mixture ratio of 1/1 by weight (hereinafter referred to as "Mixture (I)");

a mixture of the aforementioned saponification product and an ethylene/methacrylic acid copolymer having M.I. of 200 g/10 minutes (density 0.950 g/cm$^3$ and copolymerization ratio of methacrylic acid 8.54 mol%) in the mixing ratio of 1/1 by weight (hereinafter referred to as "Mixture (II)");

a mixture of an ethylene/methyl methacrylate/2-hydroxyethyl methacrylate terpolymer having M.I. of 123 g/10 minutes (copolymerization ratio of methyl methacrylate 7.51 mol% and copolymerization ratio of 2-hydroxyethyl methacrylate 4.93 mol%; hereinafter referred to as "EEH") and an ethylene/ethyl acrylate/-maleic anhydride terpolymer having M.I. of 212 g/10 minutes (copolymerization ratio of ethyl acrylate 11.2 mol% and copolymerization ratio of maleic anhydride 0.64 mol%; hereinafter referred to as "EEM") in the mixing ratio of 1/1 by weight (hereinafter referred to as "Mixture (III)"); and a mixture of an ethylene/methyl methacrylate/glycidyl methacrylate terpolymer (copolymerization ratio of methyl methacrylate 6.81 mol% and copolymerization ratio of glycidyl methacrylate 3.28 mol%; hereinafter referred to as "EBM") and an ethylene/methyl methacrylate/maleic anhydride terpolymer having M.I. of 105 g/10 minutes (copolymerization ratio of methyl methacrylate 6.91 mol% and copolymerization ratio of maleic anhydride 1.07 mol%) in the mixing ratio of 7/3 by weight (hereinafter referred to as "Mixture (IV)).

These mixtures were produced by dry blending relevant copolymers or terpolymers in a Henschel mixer for 5 minutes.

EXAMPLES 1 TO 11 AND COMPARATIVE EXAMPLES 1 TO 6

Wires were produced by circumferentially depositing the mixtures (I) through (IV), EAA, EEM, EEH, and EBM, and Saponification Product used in the preparation of the mixtures on metallic lines indicated in Table 1 by the use of an extruder provided with a cross-head (diameter 40 mm and temperatures fixed $C_1$ 100° C., $C_2$ 110° C., $C_3$ 120° C., and D 120° C.). (The thicknesses of the produced coats are shown in Table 1.)

In an oven (50 cm in length) kept at 300° C., the wires so produced were heated in an atmosphere of nitrogen gas at a rate of 50 cm/minute.

When the wires were tested for thermal stability, the coats of the wires produced in the Examples were not found to sustain any discernible deformation and the coats of the wires produced in the Comparative Examples were invariably melted during the heat treatment.

Figure 9:
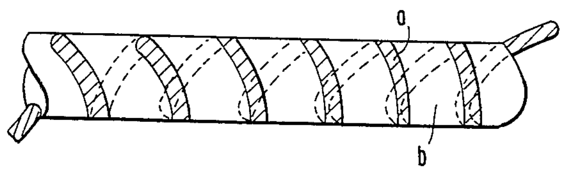
FIG. 9 is a perspective view of a typical experiment performed for testing wires obtained in working examples and comparative experiments for flexibility.

To test for flexibility and adhesion to copper and aluminum lines, the wires a were wound on a round bar b 30 mm in diameter as illustrated in FIG. 9 and the surface of the wires were visually examined. The wires produced in the Examples had smooth surfaces, and any crack exposing the underlying metallic lines was not found. In contrast, the wires obtained in the Comparative Examples had satisfactory surface conditions, but a crack was found on the surface part of the metallic lines, and the coats peeled partially when the wires were separated from the round bar.

Separately, the wires obtained in Examples 3 and 4 were similarly tested by using a round bar 10 mm in diameter. In the test, they were not found to sustain any discernible crack, indicating that they had excellent adhesion to the metallic lines.

TABLE 1

| | Coat | | Line | |
|---|---|---|---|---|
| | Kind | Thickness (mm) | Kind | Cross section ($mm^2$) |
| Example 1 | Mixture (I) | 0.2 | Copper | 1.0 |
| Example 2 | Mixture (II) | " | " | " |
| Example 3 | Mixture (III) | " | " | " |
| Example 4 | Mixture (IV) | " | " | " |
| Example 5 | Mixture (I) | " | " | 5.0 |
| Example 6 | " | " | " | 1.0 |
| Example 7 | " | 1.0 | " | " |
| Example 8 | " | 0.2 | " | 10 |
| Example 9 | " | 2.0 | " | " |
| Example 10 | " | 0.1 | Aluminum | 1.0 |
| Example 11 | " | 2.0 | " | 10 |
| Comparative Example 1 | EAA | 1.0 | Copper | 1.0 |
| Comparative Example 2 | Saponification Product | " | " | " |
| Comparative Example 3 | EEM | " | " | " |
| Comparative Example 4 | EEH | " | " | " |
| Comparative Example 5 | EBM | " | " | " |
| Comparative Example 6 | EAA | " | Aluminum | " |

EXAMPLES 12 TO 22 AND COMPARATIVE EXAMPLES 7 TO 12

By following the procedure as in Example 1, the mixtures (I) through (IV), EAA, EEM, EEH, and EBM, and Saponification Product were circumferentially deposited on the metallic lines indicated in Table 2 with the same extruder to produce wires. (The thickness of the coats so formed are shown in Table 2.)

When the wires so obtained were tested for thermal stability, the coats on the wires produced in the Examples were not found to sustain any discernible deformation and the coats on the wires produced in the Comparative Examples were invariably melted during the heat treatment.

To test the wires for flexibility and adhesion to copper and aluminum lines, the surfaces of the wires were visually examined. The wires produced in the Examples had smooth surfaces and were not found to sustain any crack exposing the underlying metallic lines. In contrast, the wires obtained in the Comparative Examples had satisfactory surface conditions but a crack was found on the surface part of the metallic lines and the coats peeled partially when the wires were separated from the round bar.

Separately, the wires obtained in Examples 12 and 13 were similarly tested by using a round bar 10 mm in diameter. In the test, they were not found to sustain any discernible crack, indicating that they had excellent adhesion to the metallic lines.

TABLE 2

| | Coat | | Line | |
|---|---|---|---|---|
| | Kind | Thickness (mm) | Kind | Cross section ($mm^2$) |
| Example 12 | Mixture (I) | 2.5 | Copper | 1.0 |
| Example 13 | Mixture (II) | " | " | " |
| Example 14 | Mixture (III) | " | " | " |
| Example 15 | Mixture (IV) | " | " | " |
| Example 16 | Mixture (I) | " | " | 0.1 |
| Example 17 | " | " | " | 1.0 |
| Example 18 | " | 1.0 | " | " |
| Example 19 | " | 4.5 | " | 2.0 |
| Example 20 | " | 2.5 | " | 3.1 |
| Example 21 | " | " | Aluminum | 1.0 |
| Example 22 | " | " | " | 2.0 |
| Comparative Example 7 | EAA | 2.5 | Copper | 1.0 |
| Comparative Example 8 | Saponification Product | " | " | " |
| Comparative Example 9 | EEM | " | " | " |
| Comparative Example 10 | EEH | " | " | " |
| Comparative Example 11 | EBM | " | " | " |
| Comparative Example 12 | EAA | " | Aluminum | " |

EXAMPLES 23 TO 33 AND COMPARATIVE EXAMPLES 13 TO 18

By following the procedure as in Example 1, the mixtures (I) through (IV), EAA, EEM, EEH, and EBM, and Saponification Product were circumferentially deposited on the metallic lines indicated in Table 3 with the same extruder to produce cables. (The thickness of the coats so formed are shown in Table 3.)

When the cables so obtained were tested for thermal stability, the coats on the cables produced in the Examples were not found to sustain any discernible deformation and the coats on the cables produced in the Comparative Examples were invariably melted during the heat treatment.

To test for flexibility and adhesion to copper and aluminum lines, the cables were wound on a round bar 30 cm in diameter and the surfaces of the cables were visually examined. The cables produced in the Examples had smooth surfaces and were not found to sustain any crack exposing the underlying metallic lines. In these cables, since the coats adhered with sufficient fastness to the metallic lines, no separation was found between the metallic lines and the coats. In contrast, the cables obtained in the Comparative Examples had satisfactory surface conditions but a crack was found on the surface part of the metallic lines and the coats peeled partially when the cables were separated from the round bar.

TABLE 3

| | Coat | | Line | |
|---|---|---|---|---|
| | Kind | Thickness (mm) | Kind | Cross section ($mm^2$) |
| Example 23 | Mixture (I) | 4.5 | Copper | 200 |
| Example 24 | Mixture (II) | " | " | " |
| Example 25 | Mixture (III) | " | " | " |
| Example 26 | Mixture (IV) | " | " | " |
| Example 27 | Mixture (I) | " | " | 400 |
| Example 28 | " | 5.0 | " | 600 |

TABLE 3-continued

| | Coat | | Line | |
|---|---|---|---|---|
| | Kind | Thickness (mm) | Kind | Cross section ($mm^2$) |
| Example 29 | " | 10.0 | " | " |
| Example 30 | " | 4.0 | " | 2.6 $mm^2$ × 37 |
| Example 31 | " | " | " | 2.6 $mm^2$ × 61 |
| Example 32 | " | " | Aluminum | 200 |
| Example 33 | " | " | Aluminum | 400 |
| Comparative Example 13 | EAA | 4.5 | Copper | 200 |
| Comparative Example 14 | Saponification Product | " | " | " |
| Comparative Example 15 | EEM | " | " | " |
| Comparative Example 16 | EEH | " | " | " |
| Comparative Example 17 | EBM | " | " | " |
| Comparative Example 18 | EAA | " | Aluminum | " |

It is clear from the results of the Examples and the Comparative Examples that the wire of the present invention has excellent flexibility and thermal stability, and withstands the heat of solder at 300° C. and, therefore, it can be used for internal wiring in electric devices, communication devices, electronic devices, and measuring instruments, and that since this wire can be connected to a conductor circuit on a printed circuit board with solder, it can be used in flexible boards and printed boards. It is evident that wire, of course, can be satisfactorily utilized in applications to polyester copper wires, polyurethane wires, and polyester-imide copper wires which are defined in JIS.

Since the wire manifests such effects as described above, it can be used in devices carried on vehicles and in powered tools as well as in electric devices, heat-proof devices, and freezers.

Further, the wire can be utilized satisfactorily as in high power cables (CV cables) coated with crosslinked polyethylene specified in JIS.

The heat-resistant wire of this invention manifests the following effects:

(1) The process of manufacture is simple because the coat can be molded and crosslinked continuously and further because the adhesion of the coat of the mixture to the line of copper or aluminum can be simultaneously carried out during the course of crosslinking operation.

(2) Since the mixture can be crosslinked very satisfactorily without use of any crosslinking agent, the produced coat enjoys excellent electrical properties (such as ability of insulation, resistance to potential, and dielectric dissipation factor).

(3) The produced coat enjoys high flexibility because the mixture can be crosslinked satisfactorily without use of any crosslinking agent.

(4) The wire can be directly soldered to a printed circuit board as in wiring devices because the wire excels in thermal stability.

(5) Owing to the satisfactory thermal stability, the wire used as a high-voltage cable exhibits outstanding insulation at elevated temperatures.

Since the heat-resistant wire of the present invention manifests such desirable effects as described above, it can be used satisfactorily as a substitute for the enameled wire which is now in popular use.

(1) Wirings to be used in, for example, coils and transformers (2) Internal wiring as in electric devices, electronic devices, and measuring instruments such as cameras, acoustic devices for radios (such as, tuners), video tape recorders and cameras therefor, television receivers, word processors and printers thereof, computers, and facsimiles (3) Communication wires, city cables and toll cables for power transmission, communication cables, high-voltage cables, submarine cables, extra-high voltage cables (4) Internal wiring for automobiles and wirings in electronic devices (such as speedometers)

(5) Wirings to be directly mounted (in the place of copper wires) on the printed circuit boards (6) A substitute for polyester copper wires and vinyl cords specified in JIS (7) Cables for general applications, traveling devices, and aerially suspended system.

While the invention has been described in detail and with reference to specific embodiments thereof, it will be apparent to one skilled in the art that various changes and modifications can be made therein without departing from the spirit and scope thereof.

What is claimed is:

1. A heat-resistant wire comprising a line of copper or aluminum coated with a shielding material obtained by heating a mixture consisting essentially of:

(A) 1 to 99% by weight of an ethylenic copolymer comprised of ethylene and 0.1 to 20.0 mol% of a comonomer (1) of at most 30 carbon atoms having an oxirane group or a hydroxyl group and having at least one double bond, said comonomer (1) having a hydroxyl group being selected from the group consisting of α-alkenyl alcohols, hydroxyalkyl acrylates and hydroxyalkyl methacrylates, and (B) 99 to 1% by weight of an ethylenic copolymer comprised of ethylene and 0.1 to 20.0 mol% of a comonomer (3) possessing a functional group capable of giving rise to at least 60 wt% of extraction residue when heated to react with said oxirane group or hydroxyl group in said ethylenic copolymer (A) at a temperature of 300° C. for 20 minutes and extracted in boiling toluene for 3 hours, said comonomer (3) being selected from the group consisting of unsaturated monocarboxylic acids of at most 25 carbon atoms, unsaturated dicarboxylic acids of 4 to 50 carbon atoms, and anhydrides of the unsaturated carboxylic acids, and wherein said shielding material contains at least 60 wt% of said extraction residue.

2. A heat-resistant wire as in claim 1, wherein the ethylenic copolymer (A) is a copolymer of ethylene and said comonomer (1) or a copolymer of ethylene, said comonomer (1) and a comonomer (2) of at most 30 carbon atoms selected from the group consisting of unsaturated carboxylic acid esters and vinyl esters.

3. A heat-resistant wire as in claim 1, wherein said comonomer (1) is an oxirane group-containing compound represented by formulae (I) to (III):

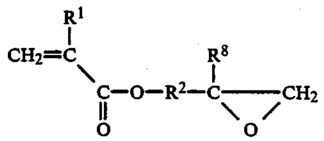

(I)

-continued

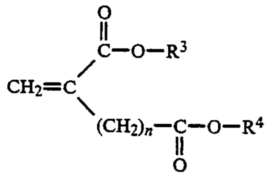

(II)

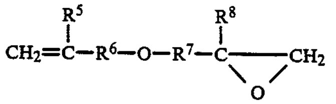

(III)

wherein $R^1$, $R^5$ and $R^8$ which may be the same or different, each represents a hydrogen atom or a methyl group; $R^2$, $R^6$ and $R^7$ which may also be the same or different, each represents a straight chain or branched chain alkylene group having 1 to 12 carbon atoms; $R^3$ and $R^4$ each represents a straight chain or branched chain alkyl group having up to 12 carbon atoms and a straight chain or branched chain alkyl group having 2 to 12 carbon atoms and having an oxirane group at the terminal, provided that at least one of $R^3$ and $R^4$ has the alkyl group having an oxirane group; and n is 0 or 1.

4. A heat-resistant wire as in claim 1, wherein said ethylenic copolymer (A) is a copolymer obtained by saponifying a copolymer of ethylene with vinyl acetate.

5. A heat-resistant wire as in claim 1, wherein said ethylenic copolymer (B) is a copolymer of ethylene and said comonomer (3) or a copolymer of ethylene, said comonomer (3) and a comonomer (2) of at most 30 carbon atoms selected from the group consisting of unsaturated carboxylic acid esters and vinyl esters.

6. A heat-resistant wire as in claim 1, wherein said ethylenic copolymer (B) is a hydrolysis product or alcohol modification product of a copolymer of ethylene and an unsaturated dicarboxylic acid anhydride or a copolymer of ethylene, an unsaturated dicarboxylic acid anhydride and said comonomer (2).

7. A heat-resistant wire as in claim 1, wherein the copolymerization ratio of ethylene in the ethylenic copolymers (A) and (B) is 50 to 99.98 mol%.

8. A heat-resistant wire as in claim 7, wherein the copolymerization ratio of ethylene is 65 to 99 mol%.

9. A heat-resistant wire as in claim 1, wherein the total copolymerization ratio of the comonomer (1) is 0.2 to 15 mol%, and the total copolymerization ratio of the comonomer (3) is 0.2 to 15 mol%.

10. A heat-resistant wire as in claim 2, wherein the total copolymerization ratio of the comonomer (2) is up to 30 mol%.

11. A heat-resistant wire as in claim 5, wherein the total copolymerization ratio of the comonomer (2) is up to 30 mol%.

12. A heat-resistant wire as in claim 1, wherein the mixing weight ratio of the ethylenic copolymers (A) to (B) is 10/90 to 90/10.

13. A heat-resistant wire as in claim 1, wherein said comonomer (1) is a monomer of at most 30 carbon atoms having a hydroxyl group and having at least one double bond and said comonomer (3) is a monomer possessing a functional group capable of giving rise to at least 60 wt% of extraction residue when heated to react with said hydroxyl group in the ethylenic copolymer (A).

14. A heat-resistant wire as in claim 1, wherein said line of the copper or aluminum is circumferentially coated directly with said shielding material.

15. A heat-resistant wire as in claim 1, wherein said comonomer (1) is selected from the group consisting of hydroxymethyl acrylates, hydroxymethyl methacrylates, hydroxyethyl acrylates, hydroxyethyl methacrylates, hydroxypropyl acrylates, hydroxypropyl methacrylates, hydroxybutyl acrylates, hydroxybutyl methacrylates, hydroxyhexyl acrylates, hydroxyhexyl methacrylates, and allyl alcohols.

16. A heat-resistant wire as in claim 1, wherein said comonomer (3) is selected from the group consisting of acrylic acid, methacrylic acid, crotonic acid, maleic acid, fumaric acid, tetrahydrophthalic acid, itaconic acid, citraconic acid, 4-methylcyclohexane-4-en-1,2-dicarboxylic acid, bicyclo(2,2,1)hepta-5-en-2,3-dicarboxylic acid and the anhydrides of these acids.

* * * * *